United States Patent [19]

Mayfield et al.

[11] 4,397,202

[45] Aug. 9, 1983

[54] UNIVERSAL PIPE LATHE

[75] Inventors: Johnny W. Mayfield, Placerville; Roger W. Totten, Sepulveda, both of Calif.

[73] Assignee: Machine Cutting, Inc., Sepulveda, Calif.

[21] Appl. No.: 179,789

[22] Filed: Aug. 20, 1980

[51] Int. Cl.³ .............................. B23B 5/08; B23B 5/16
[52] U.S. Cl. ........................................ 82/4 R; 82/4 C
[58] Field of Search ...................... 82/4 C, 4 R; 30/97

[56] References Cited

U.S. PATENT DOCUMENTS

| | | | |
|---|---|---|---|
| 1,074,334 | 9/1913 | Vosper | 30/97 |
| 1,097,152 | 5/1914 | Wagner | 30/97 |
| 2,747,274 | 5/1956 | Willard et al. | 30/97 |
| 3,908,491 | 9/1975 | Gilmore | 82/4 C |
| 4,185,525 | 1/1980 | Sherer | 82/4 C |

Primary Examiner—Leonidas Vlachos
Attorney, Agent, or Firm—Blair, Brown & Kreten

[57] ABSTRACT

Disclosed herein is a universal pipe lathe for performing plural cutting operations on pipe and the like including a lathe structure having a clamp for affixing the pipe to the lathe, a drive motor supported on a stationary ring member, and a rotatable second ring driven by the motor upon which second ring is provided cutting tools of various configurations and oriented in specific fashions so as to provide a plurality of cutting combinations for the apparatus. Additionally, an indexing mechanism is provided for advancing the cutting tool and the clamping mechanism for retaining the lathe on the pipe can be adapted to engage the pipe internally or externally. The pipe lathe has two major sections which allow the lathe to be straddled over a pipe, and a suspension mechanism is provided so that the lathe can depend from a sling suspension, or alternatively be supported by an underlying support carriage.

49 Claims, 29 Drawing Figures

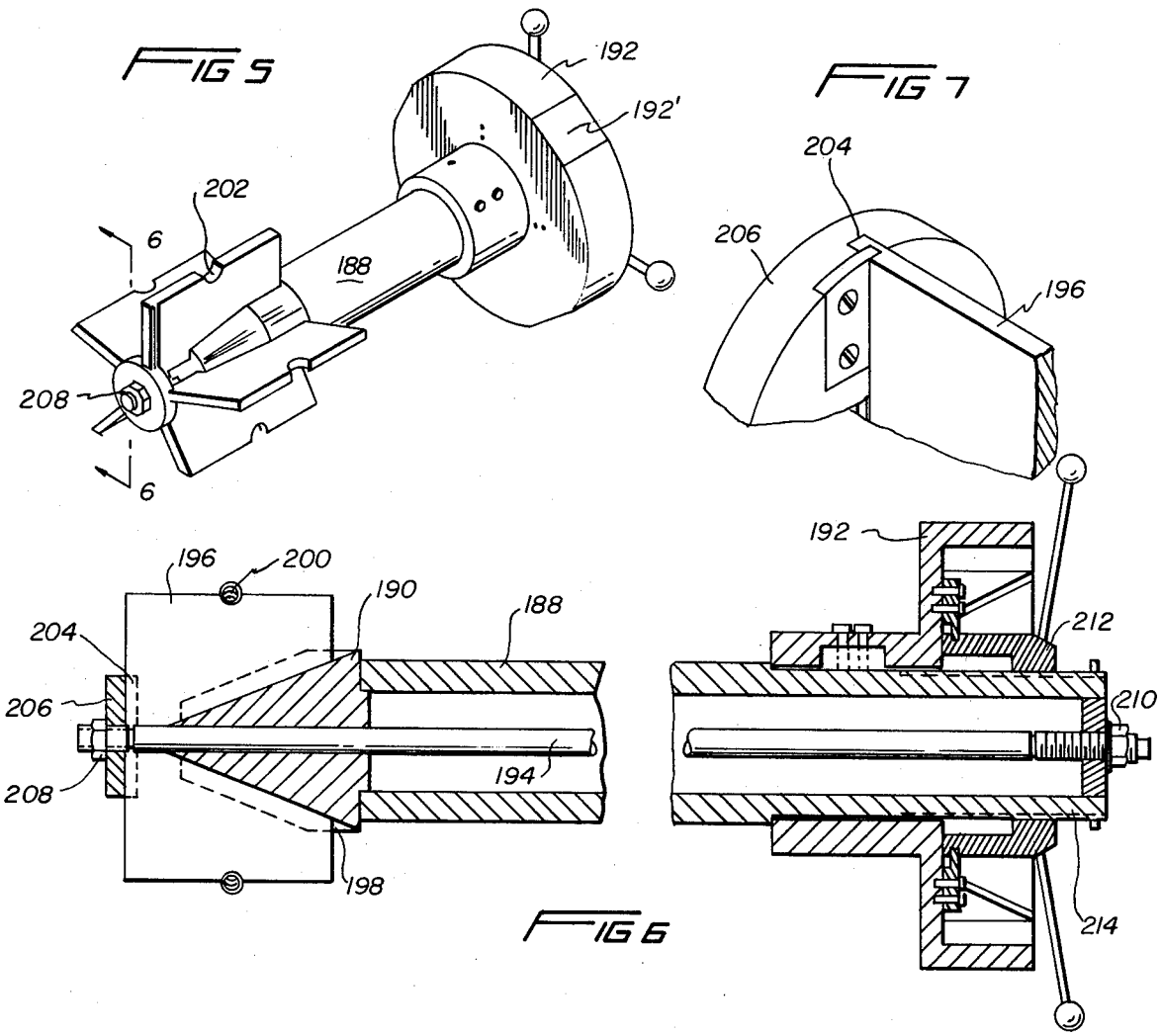
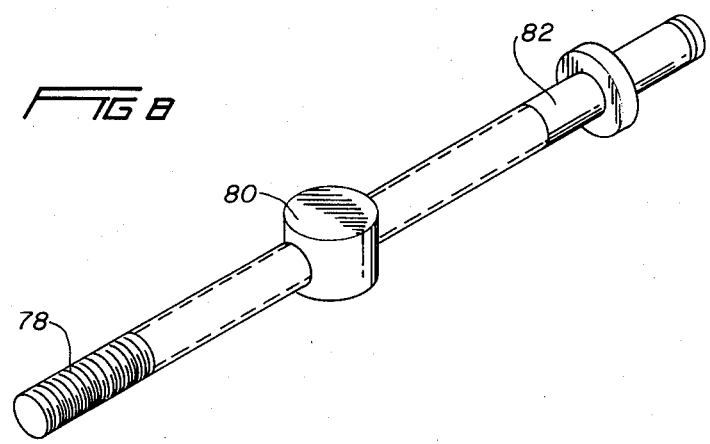

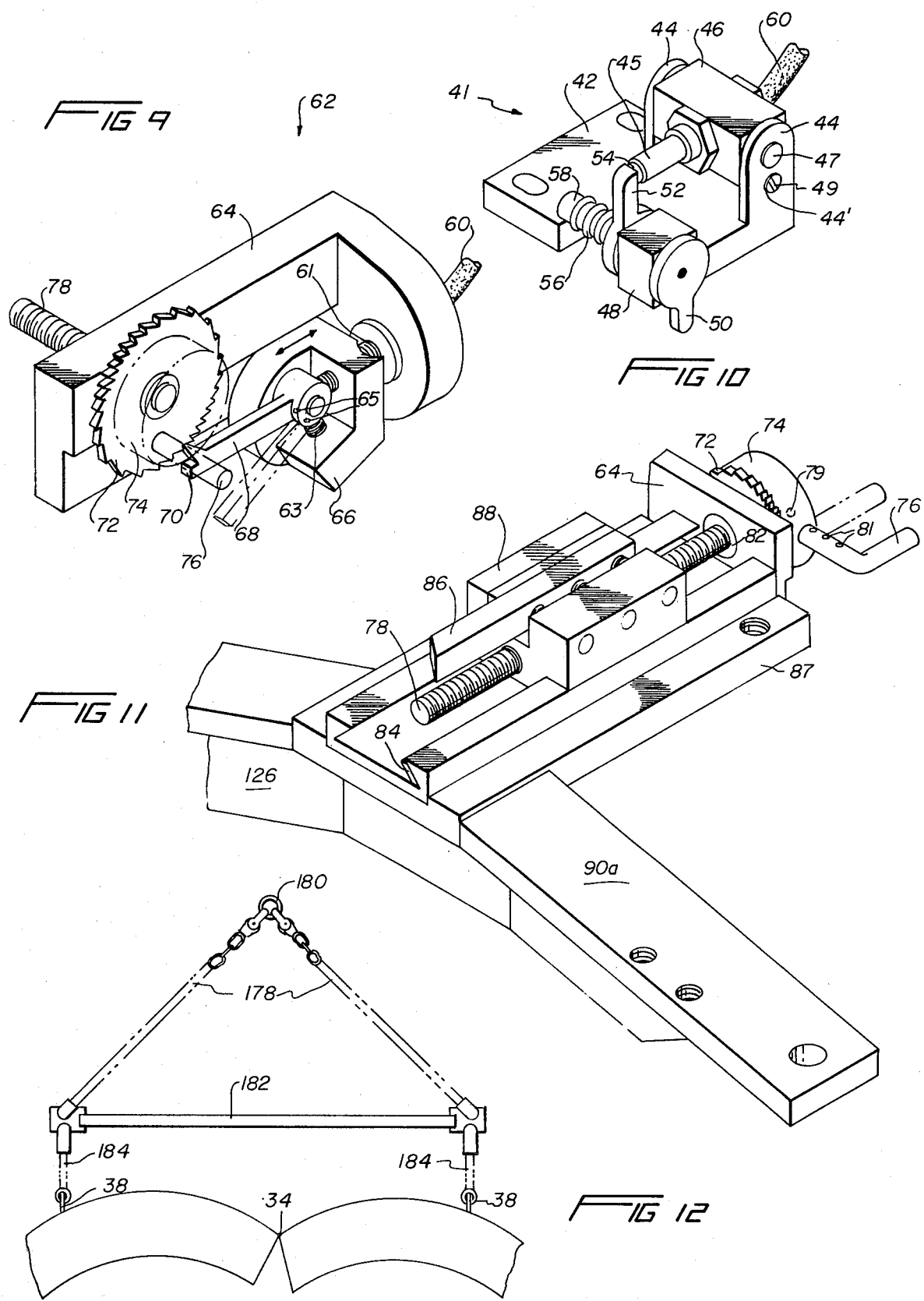

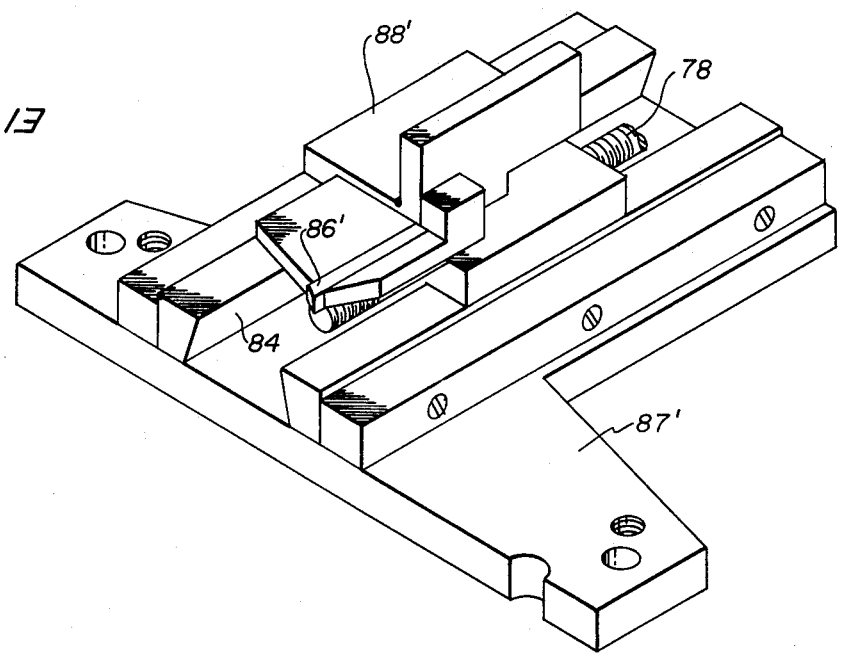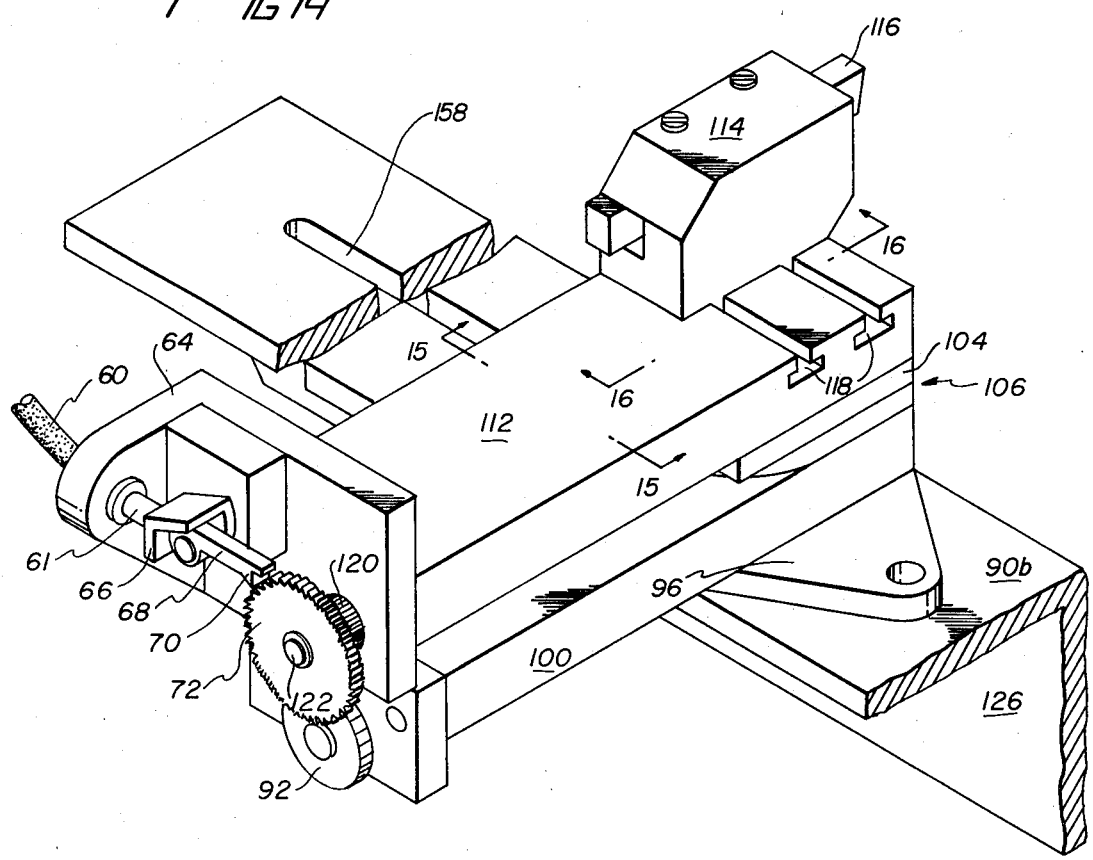

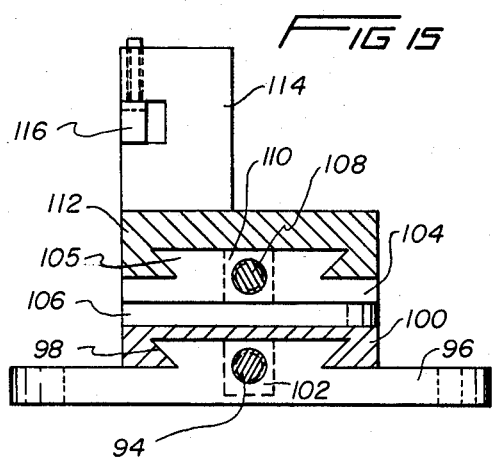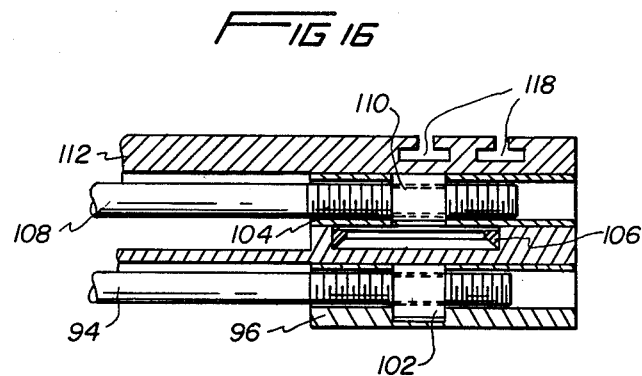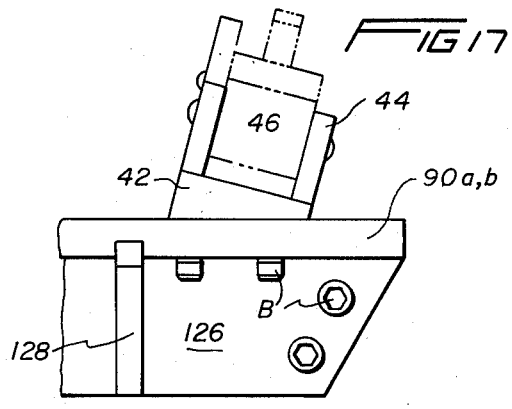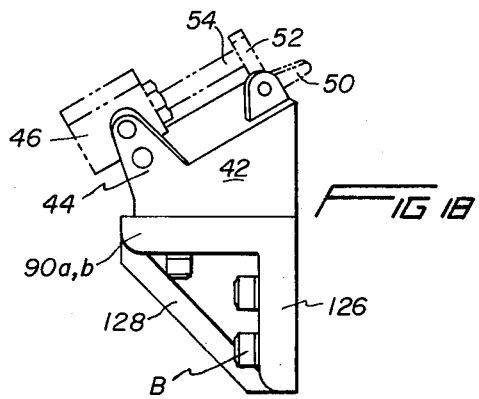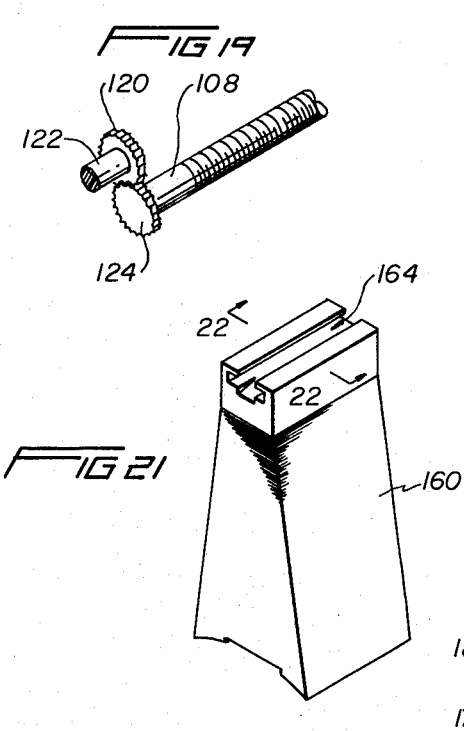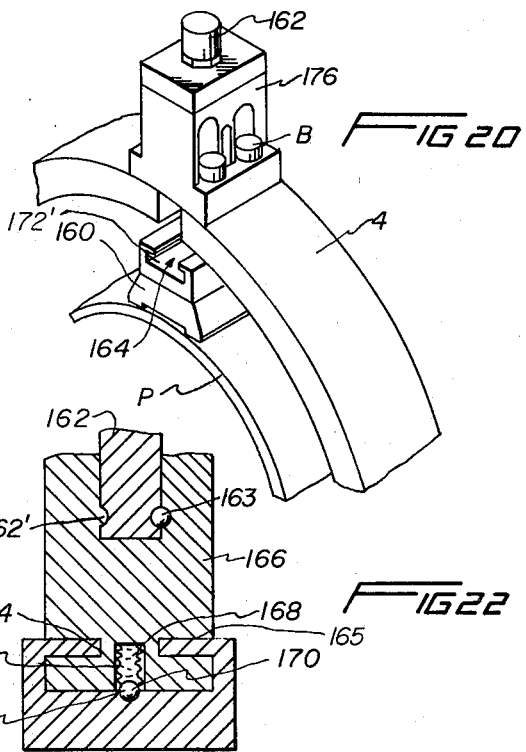

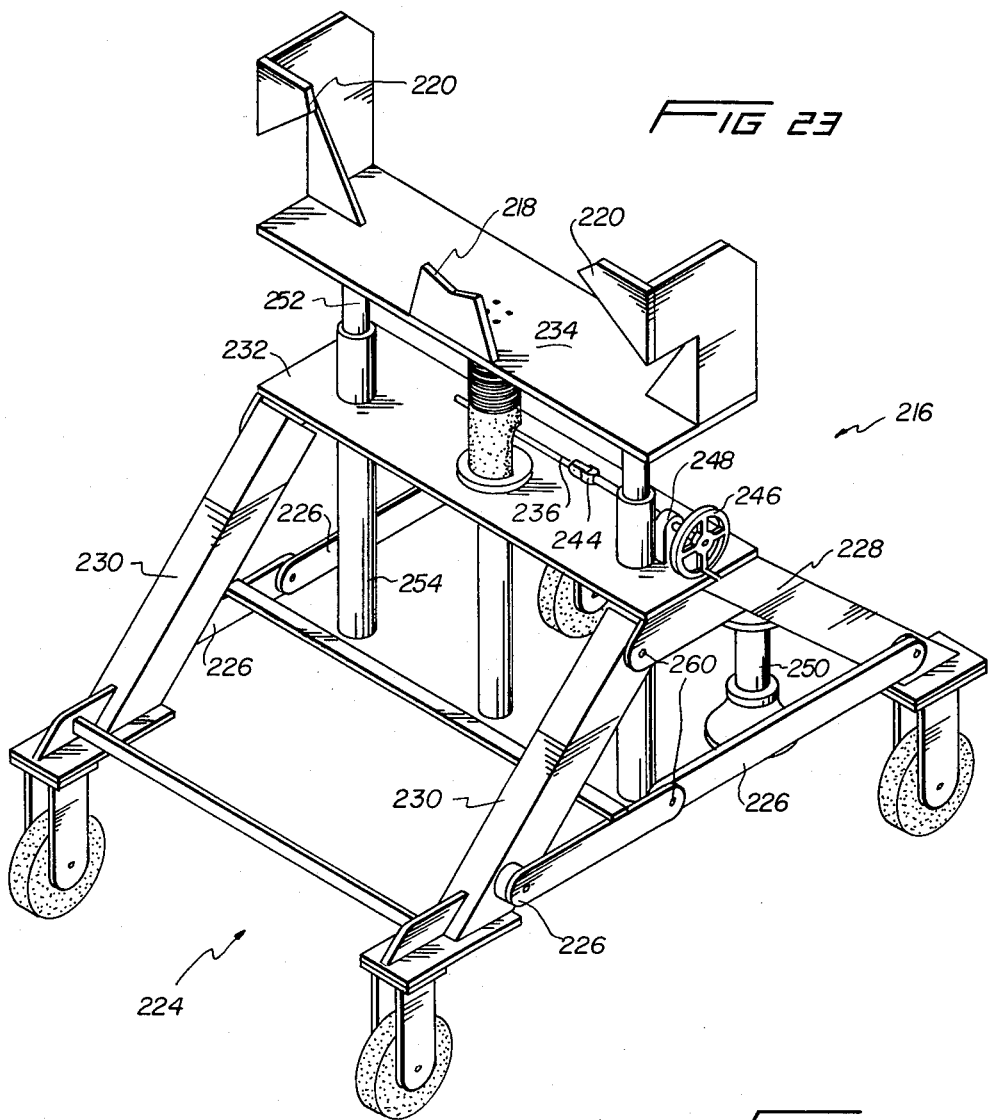
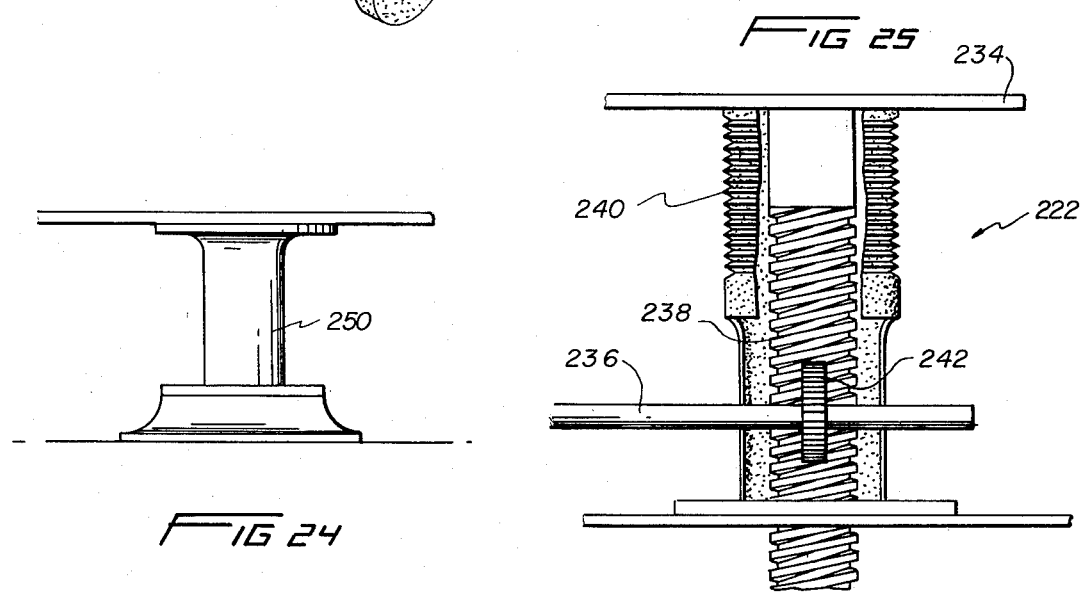

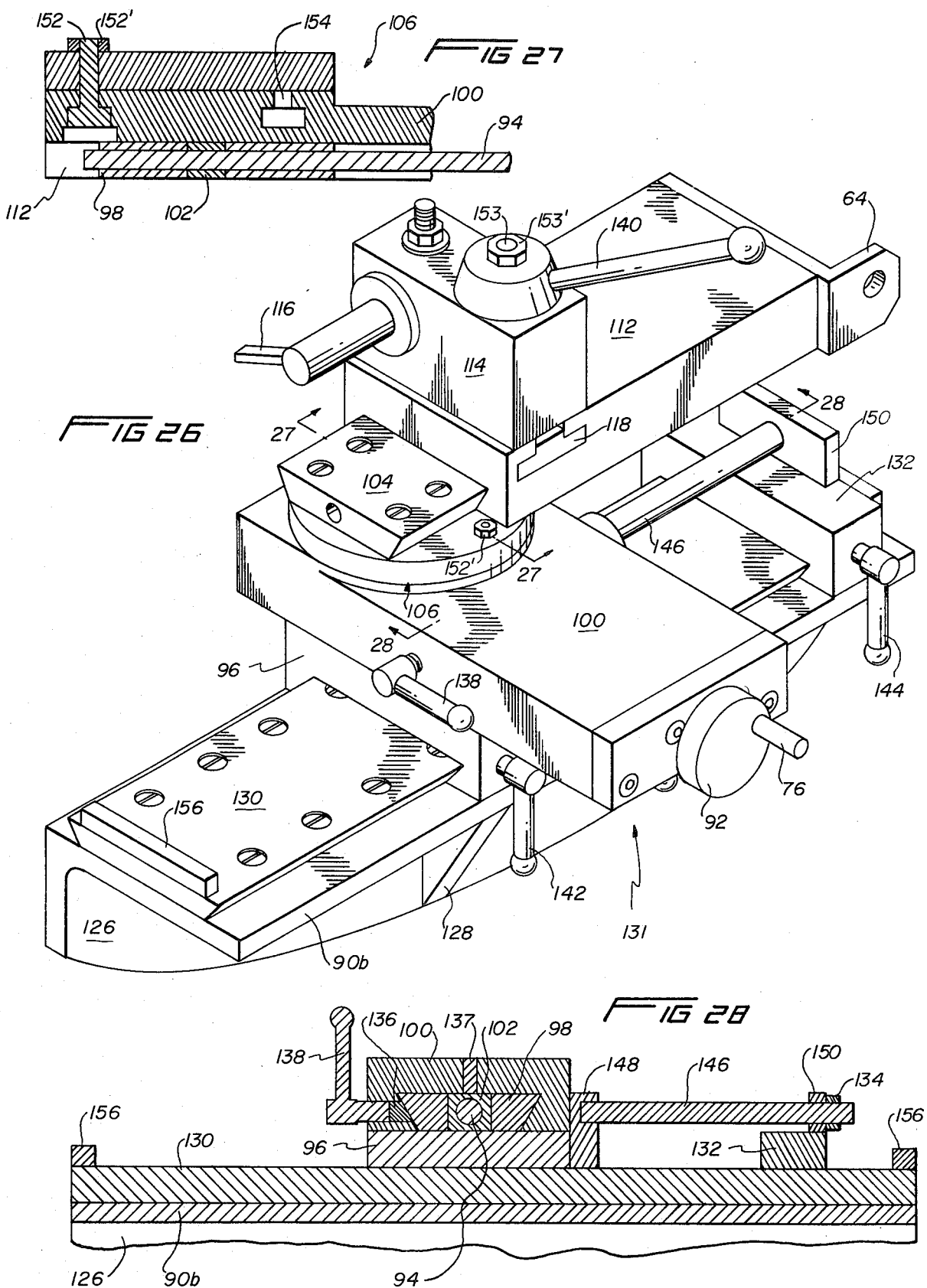

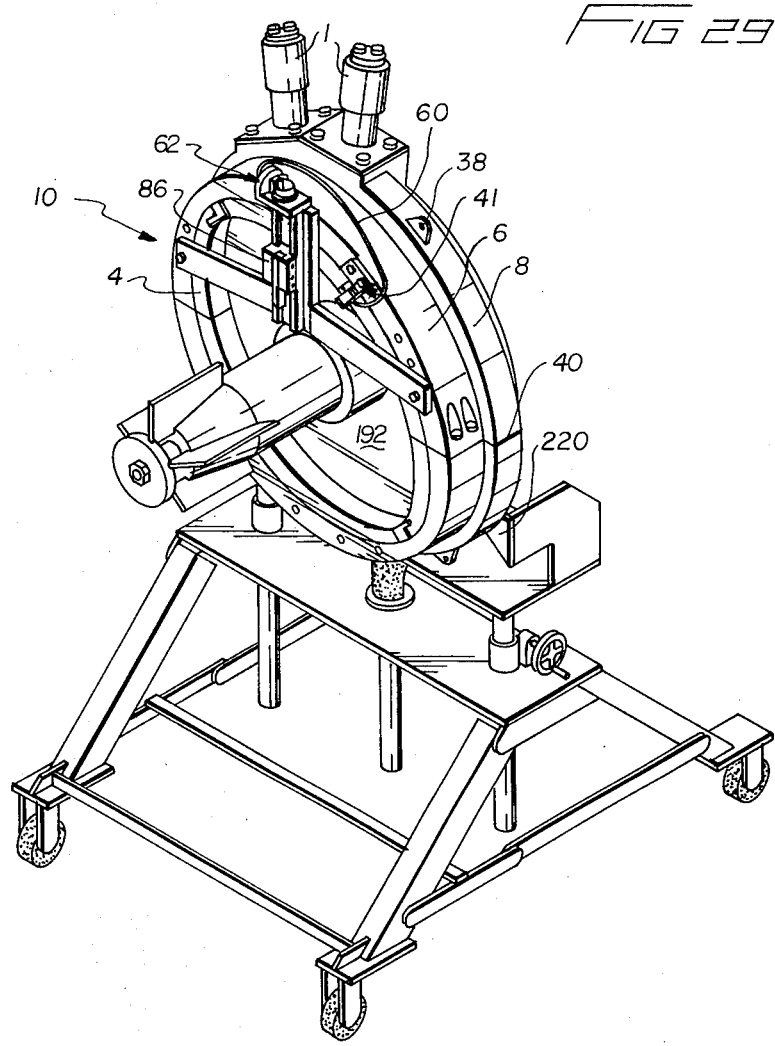

UNIVERSAL PIPE LATHE

BACKGROUND OF THE INVENTION

The necessity of providing a juncture on a pipe that is professionally finished so that it can be fastened to an adjoining pipe with a defect-free weld has been appreciated for some time. In pipe lines, nuclear reactors, and the like, the necessity to provide junctures that are reliable and durable are of the utmost importance. Frequently, the working conditions associated with pipe machining equipment have been quite hostile either to the machine or to the machine operator. For example, in nuclear reactors the necessity for pipe replacements has been such that these types of maintenance procedures are quite frequently occurring and maintenance personnel may only work in an area that is radioactively hot for extremely short periods of time. Accordingly, the desirability of an apparatus for finishing pipes which once set up can proceed automatically, and can be initialized in a minimum amount of time has found increasing importance and acceptance in industry.

Prior art devices which have attempted to address these problems in the past include the following U.S. Pat. Nos.:
  2,769,234—Young
  2,145,191—Pennington
  3,644,977—Valentine
  3,650,514—Stunkard
  3,942,248—Sherer et al.
  3,807,047—Sherer et al.
  3,744,356—Slator et al.
  3,875,831—Beauloye
  4,050,335—Gilmore
  3,762,246—Becker
  3,772,944—Becker These references while generally being directed to pipe working machinery, neither contemplate nor provide for the advantages associated with the mechanism according to the instant application.

Specifically, it is to be noted that the prior art provides for a drive mechanism in which a rotating ring is provided with a circumferential ring gear that is totally exposed and open to the elements. Clearly, when a machining operation is to occur, particulate matter such as shavings and other enviromental contaminants can interfere with the motor drive mechanism as it relates to the ring gear and can therefore provide binding in the rotation to the detriment of the work. Additionally however the exposed ring gear provides a needless hazard for the operators of the machinery, and such a hazard can be substantially magnified when working in close quarters, or in other difficult conditions such as underwater cutting and especially in combustible areas.

Additionally, the prior art fails to provide for the mechanism according to the present invention in that the indexing mechanisms are not provided on the same face of the rotating implement as the cutting tool. This, of course, makes the set-up operation for pipe working somewhat more laborious. In addition, while some of the prior art devices attempt to provide mechanism which can accommodate pipes that are not perfectly round, the actual centering operation of these mechanisms is somewhat more laborious than that which is taught in the instant application. The clamping devices according to the present invention cause this lathe to operate accurately on hollow or solid stock having square, circular, or any other external geometric configuration.

Furthermore the unique overall structure of the lathe according to the present invention does work which heretofore required two different machines: that is to say the mechanism according to the present invention has the versatility to serve as both a vertical turret lathe and an engine lathe.

SUMMARY AND OBJECTS OF THE INVENTION

Accordingly, this invention has as an objective to provide a universal pipe lathe which is capable of being affixed to the pipe in a relatively easy manner and also to assure that the pipe is symmetrically located relative to the lathe.

A further object contemplates providing an apparatus of the character described above which, when it encounters a pipe having a deformation, can easily reform the pipe back into an undeformed condition.

It is yet another object of this invention to provide a device of the character defined above which is reliable, durable in construction, and easy to operate.

It is a further object of this invention to provide a device of the character described above in which the cuts made on the pipe are of the highest quality, so that any associated and ensuing operation can be performed with a high degree of surety that welds and the like will not fail.

It is a further object of this invention to provide a device of the character described above which is capable of performing a diverse array of cutting operations, in which one cutting operation may proceed automatically and/or sequentially to the next with a minimum amount of down time.

These and other objectives are achieved by the apparatus of the present invention by providing a device which is separable along two areas of its ring structure so that it may be opened and allowed to straddle a continuous section of pipe, or alternatively may be suspended and supported by the internal portions of a pipe should only the end of the pipe be accessible. Furthermore, the mechanism to be described hereinafter provides a variety of suspension mechanisms for supporting the lathe prior to its installation on the pipe, for ease in its use. The mechanism to be described hereinafter provides a stationary ring upon which at least one drive motor is provided which drives a second rotating ring by a preferably beveled ring gear on a side face of the ring. On an opposed side face, plural diverse cutting tools are capable of being fastened thereon along with a unique indexing mechanism which allows the machine when set up to be operated automatically without further supervision. The various cutting tools allow diverse operations such as internal and external partingoff, internal and external beveling, plunging, ring cutting, and internal boring to be accomplished along various lengths of the the pipe automatically at variable angles or degrees. Pipe facing and de-burring are also equally accomplished, and the automative indexing system allows for the mechanism to provide incremental cutting at a maximum rate.

It is still a further object to provide an apparatus according to the above objectives which can provide all of the benefits associated with vertical turret lathes and engine lathes simultaneously, thereby eliminating costly secondary operations.

These and other objectives and benefits will be made manifest when considering the following detailed application when taken in conjunction with the drawing figures.

BRIEF DESCRIPTION OF THE DRAWINGS

FIG. 5 is a perspective view of a mandrel for retaining the lathe within the pipe;

FIG. 6 is a sectional view taken along lines 6—6 of FIG. 5;

FIG. 7 is a detailed perspective view of the left hand side of FIG. 5;

FIG. 8 is a perspective view of a cutting mechanism advancing device;

FIG. 9 is a perspective view of an initalization and one form of indexing mechanism receiving unit for a cutting device.

FIG. 10 is a perspective view of the indexing mechanism sending unit.

FIG. 11 is a perspective view of the external beveling cutter according to the present invention;

FIG. 12 is a front view of the support sling according to the present invention;

FIG. 13 is a perspective view of the external part-off cutter according to the present invention;

FIG. 14 is a perspective view of the internal beveling cutter according to the present invention;

FIG. 15 is a sectional view taken along lines 15—15 of FIG. 14;

FIG. 16 is a sectional view taken along lines 16—16 of FIG. 14;

FIG. 17 is a front view of the indexing sending mechanism shown in FIG. 10;

FIG. 18 is a side view thereof;

FIG. 19 is a fragmentary view of an advancement mechanism for FIG. 14;

FIG. 20 is a perspective view of a second lathe supporting member for external mounting of the lathe upon the pipe;

FIG. 21 is a perspective view of the support shoe shown in FIG. 20 having a different dimension to accommodate pipes of different sizes;

FIG. 22 is a sectional view taken along lines 22—22 of FIG. 21 including an additional member for tightening the shoe onto the outer contour of the pipe.

FIG. 23 is a perspective view of a support carriage adapted to replace the sling of FIG. 12;

FIG. 24 is a rear view of the supporting foot shown in FIG. 23;

FIG. 25 shows the height adjustment mechanism for the support carriage of FIG. 23;

FIG. 26 is a second form of an internal beveling tool to that shown in FIG. 14;

FIG. 27 is a sectional view taken along lines 27—27 of FIG. 26; and

FIG. 28 is a sectional view taken along lines 28—28 of FIG. 26.

DESCRIPTION OF THE PREFERRED EMBODIMENT

Figure 1:
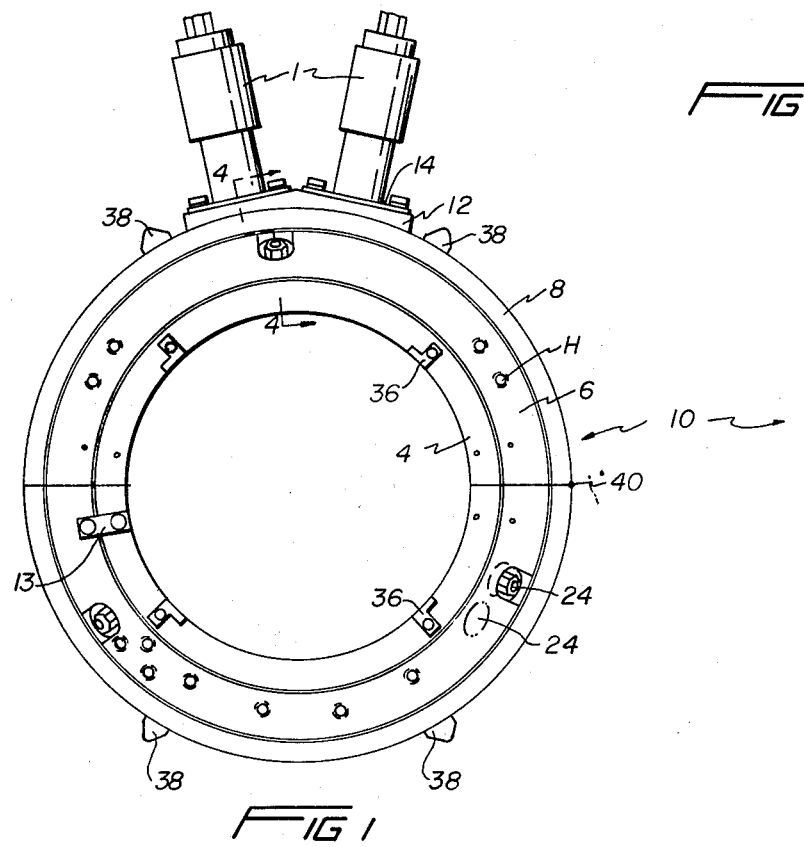
FIG. 1 is a front view of the pipe lathe according to the present invention.
Figure 2:
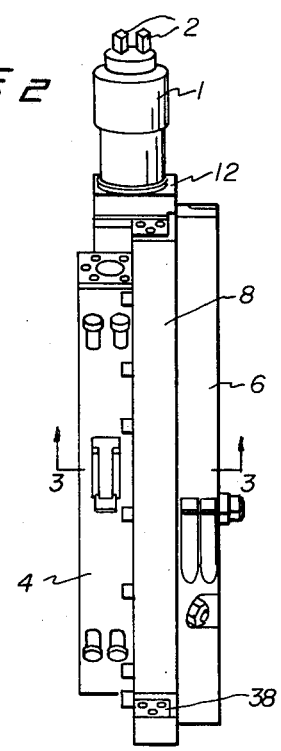
FIG. 2 is a side view thereof.

Referring to the drawings now, wherein like reference numerals refer to like parts throughout the various drawing figures, reference numeral 10 is directed to the universal pipe lathe according to the present invention.

This lathe can generally be regarded as having a stationary ring 4, a portion of which underlies a second rotating ring 6 (FIGS. 1-4). The rotating ring 6 is supported upon the stationary ring 4 by means of adjustable support rollers 24 freely rotatable within a "V" shaped trackway 26 formed from two symmetrically fashioned pieces. The rollers 24 are capable of replacement and alignment by means of a threaded shaft 25' and locknut 27' provided within a cap area 24' capable of being opened on the rotating ring 6 should the need arise. Non-adjustable rollers (shown in phantom in FIG. 4) are angulated relative to the other rollers shown, and also ride in the trackway in rolling engagement, so that together, axial and radial play are eliminated. At least six rollers are preferred equispaced in pairs.

Preferrably two drive motors which reduce gear tooth load, require smaller gears and increase and distribute torque with no lag, are provided and are capable of excitation by means of hydraulic or pneumatic lines 2 in a manner well known in the art. The motors 1 are supported on the stationary ring 4 by means of an adapter plate 14, the configuration of which is variable to accommodate either type of motor, and depending downwardly from the motor is a shaft 18 which has on its downwardly extending terminus a conically tapered drive gear 20 adapted to mesh with a ring gear 22 fastened on a side face of the rotating ring 6. A housing is provided which isolates the ring gear 22 and the drive gear 20 and is defined by an L-shaped backhousing 28 which terminates with the mounting plate 14 on the top face, and a front wall 12, 8 is provided to occlude external contamination by metal shavings, dirt, water, and conceivably the apparel of the machine operator. To assure complete sealing, the rotating ring 6 is further isolated from the drive area by means of an upper seal 16 extending between the front housing portion 8 and a second seal 16' disposed between the stationary ring 4 and the rotating ring 6 on a front area of the lathe.

Figure 3:
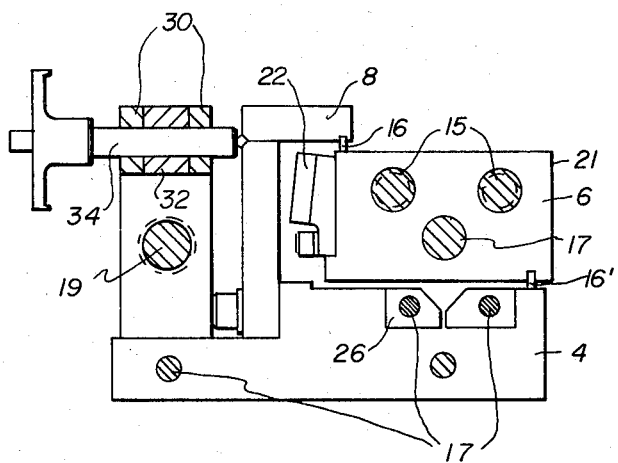
FIG. 3 is a sectional view taken along lines 3—3 of FIG. 2.
Figure 4:
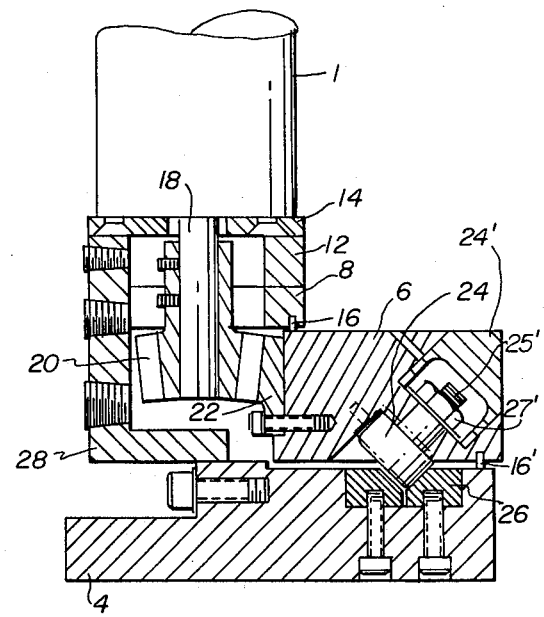
FIG. 4 is a sectional view taken along lines 4—4 of FIG. 1.

The members 4, 6, 8, 22 and 26 are capable of being split so that once open they may straddle a pipe given a situation wherein the pipe is of continuous length and access to an end portion of the pipe is not possible. FIG. 3 details a fastening mechanism preferred in the joining of the split frame member sections. Along a diameter of the rings, both extremities of the diameter have junctures defining the two thus formed member sections pivotable by means of hinge pins 34, the juncture of which is provided with a bifurcated yoke 30 on one section which has interposed therebetween a tongue 32 provided on the other section. Apertures are provided through the yoke and tongue so that when the apertures are in registry, the travel limiting hinge pin 34 can be inserted therethrough in order to pivot the sections of the split frame. Retaining blocks 13 (FIG. 1) are used to affix rings 4 and 6 when the frame is split. In actual use, (FIG. 3) dowels 17 serve to align the sections, bolt 19 provides actual retention, and bolts 15 remove the actual travel (⅛ inch) allowed by pin 34 to clear the dowels 17. FIG. 1 details a cam surface 36 provided flush along the inner periphery of the stationary ring 4 and ear members 38 on an outer periphery of purposes to be defined later.

As stated supra, indexing means are provided which includes at least one cam surface 36 disposed on a side face of the first ring member 4 nearest a second side face 21 (FIG. 3) of the second ring member 6, and it is to be noted that the second ring member 6 rotatably carries thereon follower means 41 (FIG. 10) oriented to travel over the cam surface 36 so as to advance cutting means to be described. Two forms of support bars which extend along a chord of the second ring 6 disposed on holes H (FIG. 1) thereof bear the legend 90a and 90b, FIGS. 11 and 14 and carry some of the various cutting means. Specifically, the follower means 41 includes a follower support block 42 carried on a support bar 90(a), (b) for storage only (when working, block 42 mounts on ring 6). Block 42 has a follower 50 depending therefrom and oriented to engage the cam surface 36, the follower 50 being carried on a follower shaft 58 which is provided with a light torsion spring 56 so that the follower 50 will stay in contact with a plunger 54 through a bell crank 52 at all times including when being rotated by the cam. Follower shaft 58 has fixedly mounted thereon the bell crank 52 oriented to engage a plunger 54 integral with a fluidic master cylinder 45 carried in trunnion block 46 supported on the follower support block 42 by means of a pair of upstanding yoke elements 44 which straddle the trunnion 46 but allow rotation about pivot 47 whose travel is limited by pin 49 in yoke slots 44' to assure registry between bell crank and plunger, this being desireable so as to not damage the plunger, etc., when the machine is reversed.

The fluidic pulse is carried along the fluid containing line 60 and the line terminates and drivably engages cutting means having various configurations disposed on a support block. FIG. 9 shows a typical installation in which the cutting means support block 64 is provided with a second hydraulic cylinder and return spring 61 which are attached to the fluid line 60 and its plunger is axially extendable by the fluidic pulses. A pawl 68 which includes a directional advancing tooth 70 is supported on a pawl mount 66 axially translatable (see arrows) on the cutting means support block 64 so that axial translation of the pawl mount 66 and therefore rotation of the pivoted pawl is possible as it coacts against and advances a ratchet wheel 72 so that the rotation of the ratchet wheel 72 can advance a cutting mechanism driven by the ratchet wheel 72 through lead screw 78. Spring plunger screw 63 operates in detents 65 to keep pawl 68 from rotating out of position. Initializing means are included on the outer face of the ratched wheel which is shown in FIGS. 9 and 11 and comprise a hand crank 76 disposed on an outer face of a knurled hand knob 74. In some cases for facilitating rapid initialization, the crank 76 is extendable radially from the knob 74 by a biased ball 79 and detent system 81 as shown in FIG. 11. That figure depicts a cutting means defined as an external beveling tool and includes a beveling support block 87 carried on the support arm 90a, a tool holder 88 slidably disposed in a dovetailed trackway 84 formed on the support block, and as shown, a removable cutting tool 86 is fastened to too holder 88 by means of screws. FIG. 8 shows how the tool holder 88 is advanced along the length of the lead screw 78, and the lead screw 78 is fastened to the support block portion 64 nearest the ratchet 72 through a thrust collar 82 as shown in FIGS. 8 and 9. The lead screw 78 has a bronze threaded block 80 carried in the tool holder 88 and capable of advancement along the length of the lead screw as the ratchet wheel 72 rotates.

FIG. 13 shows a cutting means defined as an external part-off tool operating on the same mechanical principles as that which is defined in FIG. 11, but the cutting tool bears a different geometrical configuration and accordingly so does the tool holder 88'. Further, whereas the tool holder support block 87 in FIG. 11 has a substantially rectangular configuration, the support block 87' in FIG. 13 defines a substantially "T" shaped block wherein the head or top portion of the "T" tapers towards the base away from the cutting tool. Two or more external part off tools can be simultaneously used: the first for an initial cut, and the second cuts a clearance for the first thereby preventing binding.

With reference now to FIGS. 14, 15, 16, and 19, there is shown an internal beveling cutting means according to one form of the present invention. This device is provided with a cutting means support block 96 carried on the support bar 90b. This internal beveling tool is defined by an indexing wheel 92, a first lead screw 94 (FIG. 16) supported on the block 96 and affixed on one end to the indexing wheel 92, a first dovetail trackway 98 (FIG. 15) formed on the block 96, a slide body 100 having a lower portion disposed in the dovetail trackway and having a threaded block 102 engaging the first lead screw 94 so that rotating the indexing wheel 92 manually extends and retracts the slide body 100 along the length of the first lead screw. The bronze threaded block 102 is similar to that which (80) is shown in FIG. 8. A slide body upper portion 104 which has a second dovetail trackway 105 formed thereon is connected to the lower portion by means of a slide body intermediate portion 106 which has the form of a swivel including an inner lipped cup which frictionally rides within an outer rimmed cup receptive portion so that rotation between the upper and lower portions is possible. A second lead screw 108 is provided and supported by the second dovetail trackway 105 and by means of a threaded sleeve 110 carries a tool holder support plate 112 so that the second lead screw 108 is responsive to the ratchet wheel 72. A tool holder 114 is disposed on the tool holder support plate 112 and a cutting tool 116 is fastened in the tool holder with screws. The tool holder is adapted to translate laterally relative to the longitudinal extent of the second lead screw 108 by means of trackways 118 on the tool holder support plate 112 so that the tool holder can be displaced to one side or the other. FIG. 9 shows and describes the similar advancing system.

Differences between the two support bars 90a and 90b (FIGS. 11 and 14) can now be readily perceived. The first support bar 90a is angulated so as to form a substantially "V" shape configuration whereas the second support bar 90b is linear and is provided with a slot 158 along the central flat outer portion thereof to allow the internal beveling cutting tool to be translated along the length of the slot. Both support bars have a downwardly extending bracing mechanism which, in section, would appear to give the support bar 90 a T-shaped or L-shaped configuration for additional rigidification.

As partially shown in FIG. 14, and further depicted in FIG. 19, the ratchet wheel 72, for clearance reasons, may drivably engage the second lead screw 108 through a first gear 120 connected to the common shaft 122 which first gear 120 then drivably engages a second gear 124 carried on the second lead screw 108.

As shown in FIGS. 17 and 18, the depending portion of the support bar 126 is provided with bores which are adapted to align with holes H on the rotating ring 6 so that the rotation of the ring 6 causes rotation of the cutting element while the indexing element 41 for the cutting operation is removed from storage on 90 and placed on rotating ring 6 contacting cam surface 36. Additional support is provided by an angulated beam 128 extending between the top face 90a, 90b of the support bar and the downwardly extending bracing mechanism 126.

FIGS. 26, 27 and 28 show a second form of the internal beveling machine in which a further intermediate trackway having a dovetail is provided, and additional locking constraints are provided to assure that all types of internal beveling can be effected. Specifically, those parts common to both species bear the same reference numerals but the additional dovetail trackway and advancing mechanism is shown as reference numeral 131 generally. The upper and lower portions and intermediate swivel all bear similar reference numerals to the previously discussed internal beveling tool, and the modifications provide an additional degree of freedom, as well as varied locking mechanism for the dovetail trackway and the support bar 90b as will now be detailed. It is apparent that in FIG. 14 the elongate slot 158 requires that nuts and bolts be loosened in order to translate the internal beveling mechanism along the length of the support bar 90b. With the current mechanism of FIG. 26, this translation can be effected in a manner similar to the dovetail trackway translation defined by the upper portion of the internal beveling attachment. FIG. 27 also provides a further form for the swivel 106 in which it is shown that a downwardly depending inverted "T" shaped rod 152 is disposed in such a manner that rotation of the upper beveling portion 104 relative to the lower beveling portion 100 (FIG. 26) can be expeditiously effected and locked with nut 152'. Further, the mechanism for affixing the tool holder 114 to the tool holder support plate 112 is shown as being a threaded bolt 153 which extends downwardly into the trackway 118 so that the track is firmly affixed between bolt 153 and nut 153'. By tightening the nut 153', the support plate 112 and the tool holder 114 are firmly affixed. Lever 140 is used as a handle to change tool 116. Similarly, the dovetail trackway 98 (FIG. 28) is constrained from displacement not only by the lead screw 94, but also by engagement of the lever 138 against the dovetail trackway 98 through an intermediate element friction pad 136. To further allow the internal beveler to translate along the length of the support bar 90b, a third dovetail trackway 130 is bolted therebetween having abutments 156 at opposed extremities of the dovetail to constrain the motion of the beveler. The lower portion of the cutting means supporting block 96 has a complemental cut away portion to ride on this trackway 130. Similar to the other locking lever 138, further locking levers 142 and 144 are deployed for frictional engagement against the surface of the dovetail trackway 130 as best seen in FIG. 26. The device has a further stop member and support means as shown to the right of FIG. 28 wherein an abutment block 148 is placed in tangential registry with the supporting block 96. The abutment block 148 is connected through threaded micrometer rod 146 to an apertured stop plate 150 supported on slide 132, and on the right hand portion, the rod 146 has a knurled micrometer advancement 134 thereon which allows fine adjustment of the internal beveler along trackway 130 when lock up lever 144 is locked and lever 142 is unlocked.

To assure that any of the compound slide assemblies comprising for example elements 100, 98, 96 of FIG. 28 are accurately fabricated, and very strong, the following technique for a precision sliding fit follows the following method:

Assemble first the slide 100 with the dovetail 98 and hold same in place by means of a set screw 137. The bottom surfaces of these two elements are ground flat simultaneously to provide a zero clearance fit. The dovetail 98 is then removed and a very slight amount is ground off of the slide bottom surface 100 to give a close tolerance fit so that when the dovetail is bolted to the supporting block 96 a very tight interconnection is provided.

In one form of the invention, the pipe lathe is provided with clamping means so that when a continuous pipe section is not accessible at an end portion thereof, the pipe lathe may be split as detailed in the description of FIG. 3, and caused to straddle the pipe as best seen in FIG. 12. In this case a sling is attached to the ears 38 described hereinabove and the sling which in the preferred form is comprised of a triangle having two substantially equal legs 178 of chain or the like, depends from ring 180.

The triangle is made complete by means of a crossbar 182 extending between termini of the legs 178 remote from the ring 180. Downwardly depending chains 184 are hooked to the ears 38 as shown in FIG. 12 so that the pipe lathe can be split and caused to straddle the pipe to be worked on. It should be appreciated that the pin 34 of FIGS. 3 and 12 can serve as the hinge pintle so that both opposed sides of the split sections can be disassembled if so desired. Once the pipe has been circumferentially straddled by the lathe, clamping means are provided in order to support and retain the pipe lathe thereon. FIGS. 20, 21, 22 detail a preferred form of the clamping means in which shoes 160 are provided and interposed between the pipe P and the first ring 4. An adjusting bolt 162 is fastened to and extends through the first ring 4 so that when the bolt is tightened against the shoe 160 the pipe can be fixedly secured to the lathe and adjustment of the adjusting bolt 162 can provide and assure that the pipe is centered therewithin, expecially when four shoes are used. In order to assure centering, at least two such shoes must be present. It is further contemplated that the adjusting bolt 162 is fastened through the first ring 4 by means of a adjusting bolt block housing 176 which is provided on an outer face of the ring 4 so that the bolt extending therethrough can find suitable purchase and ease in adjustment. The bolt 162 may have an annular groove 162' (FIG. 22) for use with a retaining dowel 163 thusly:

The shoe 160 in a preferred form includes a contour bottom surface complemental to the curvature of the pipe P, and a closed slot mechanism 164 which in cross-section (FIG. 22) details a rectangular void having one face thereof open for slidable insertion therein of a space block 166. For this purpose, the space block 166 is provided with inwardly directed grooves 165 to assure sliding contact with the slot 164 as shown. Once in registry, the groove 165 in the spacer block 166 is constrained from lateral displacement along the length of the slot 164 by means of a ball plunger 170 being biased by spring 168 formed within a recess on the spacer block, and the ball plunger registers with a detent 172 provided on the shoe. The recess is shown as 186. A chamfered surface 172' on slot 164 allows ease in sliding the spacer block 166 and ball plunger 170 therein.

When the pipe is capable of engagement from an inner portion of the pipe, for example when the terminus of the pipe extends only a short distance (inches) out from a wall, the pipe can retain the lathe thereon by use of the mandrel depicted in FIGS. 5 through 7. The mandrel can be centered or off centered to work on pipes that are out of round or have differences in wall thickness. As shown therein, the second form of clamping means comprises a tubular mandrel 188 which is partially inserted within the bore of the pipe, and the mandrel is fastened to the bore at one extremity. As shown expecially well in FIG. 6, a cone shaped terminus 190 is provided with trough like guide slots 198 within which are disposed a plurality of outwardly radiating vanes 196 which are provided with notches 202 adapted to receive a spring resilent tensioning member 200. Forward of the vanes there is a plate member 206 having radially extending grooves 204 whose function will be described at this time.

Centrally disposed within the tubular mandrel is shaft 194 having a threaded terminus upon which nut 208 is fixed so that retraction of the shaft 194 in the direction to the right as shown in FIG. 6 will cause the vanes 196 to ride upwardly on the cone so as to allow the vanes to engage the inner portion of the pipe. By appropriate manipulation of nut 210 at the extremity of threaded shaft 194 remote from the terminal disc 206 provided with the grooves 204, the vanes 196 can be appropriately deployed. The other extremity of the mandrel is provided with an annular disc 192 having a portion in threaded engagement with an outer periphery of the tubular mandrel 188, and the threads 214 coact with a handle and support sleeve 212 so that rotation of the sleeve 212 will cause axial translation of the mandrel. It is contemplated that the annular disc 192 can be provided with the shoe retention element (FIG. 20 through 22) discussed supra if the mandrel is to be affixed to the pipe at the outer end of the pipe, these shoes resting on flats 192' and the lathe supported thereon.

A further alternative support to the sling can be found in FIGS. 23 through 25 wherein support means are displayed which includes a stand 216 having a nesting surface 218, 220 complimental to the first stationary ring 4. Adjusting means 222 (FIG. 25) are provided for elevating the nesting surface as required which is defined by a threaded jack 238 that coacts with a worm screw 242 actuated by a shaft 236 connected to crank wheel 246 that extends through a bearing 248, the shaft 236 having a universal joint 244 on the shaft to provide clearance around sleeves 252 and 254. The shelf 234 which serves as the substrate for the nesting surface is affixed to the jack 238 and therefore elevates the nesting surface up and down in coaction with the telescoping sleeves 252 and 254 respectively. The elevating means in turn are supported and carried by a wheeled carriage 224 which is foldable by means of arms 226 having hinges 260 as shown in FIG. 23. Specifically, a pair of angulated upper bracket members 228 and 230 are in hinged relationship so that folding occurs along the front face of the support means, and the hinged arms 226 fold in conjunction therewith so as to allow the stand to require minimum of space when in storage. For added stability, a foot member 250 is provided along a rear back support plate of the carriage, which when downwardly deployed effectively prohibits the stand from unwanted motion.

Having thus described the invention, it should be apparent that numerous structural modifications and adaptations may be resorted to without departing from the spirit of the invention.

What is claimed is:

1. A universal lathe for performing plural diverse cutting operations on pipe and the like, comprising, in combination:

clamping means for affixing said lathe to the pipe, a first stationary ring member interposed between said clamping means and said lathe, a second rotating ring member overlying a portion of said first ring and supported thereon along a bottom face of said second ring, drive means on said first ring including an output means, a ring gear on a first side face of said second ring member in meshing engagement with said output means, cutting means carried by said second ring member whereby when said second ring member rotates, said cutting means engages the pipe, a follower means operatively associated with said cutting means adapted to advance said cutting means including at least one cam surface on said first stationary ring member, said follower means disposed on said second rotating ring member oriented to travel over said cam surface, and fluidic pulse means extending between said follower means and said cutting means whereby fluidic pulses generated by said follower means traveling over said cam surface similarly indexes said cutting means for advancement thereof by indexing means.

2. The device of claim 1 wherein said second ring is supported on said first ring by roller means depending from said second ring and riding in a trough on said first ring.

3. The device of claim 2 wherein said first and second rings are each formed from two sections defining junctures which are divided along a chord line to allow said lathe to encompass a section of pipe along its length thereof and said ring sections are each attached by means of hinges at each section defined by an apertured bifuracted yoke on one said section which sandwiches an apertured tongue at the other said section and fastens thereto by a pin extending through said apertures.

4. The device of claim 3 wherein said drive means comprises a fluidic drive motor disposed along a radial line of said rings on the outer circumference thereof.

5. The device of claim 4 wherein said output means includes a drive shaft extending downwardly from said motor and terminates in a truncated conical gear.

6. The device of claim 1 wherein said indexing means comprises at least one said cam surface provided on a side face of said first ring member nearest said second side face of said second ring member, and said second ring member rotatably carries thereon said follower means oriented to travel over said cam surface, said follower means advancing said cutting means.

7. The device of claim 6 wherein said follower means comprises: a follower support block, a biased cam follower shaft having a follower thereon carried on said follower support block, a bell crank fixedly mounted on said cam follower shaft, a fluidic master cylinder carried on said follower support block having a plunger means addressing said bell crank, whereby rotation of said follower over said cam surface causes said bell crank to depress said plunger means thereby providing a fluid pulse.

8. A device of claim 7 or 1 wherein said fluidic pulses are carried from said follower means to said cutting means through a fluid containing line, and said line terminates on a cutting means support block: a ball plunger attached to said fluid line and extendable by said fluidic pulses, a pawl mount carried on said cutting means support block, and moved by said ball plunger, a ratchet pawl mounted on said pawl mount and with said pawl mount oriented to rotate a ratchet wheel, said cutting means connected to and advanced by said ratchet wheel.

9. The device of claim 8 wherein said ratchet wheel includes initializing means on an outer face thereof which advances said cutting means to a working position.

10. The device of claim 9 wherein said initializing means comprises a hand crank on said ratchet wheel.

11. The device of claim 1 wherein said cutting means includes a cutting tool and is defined by a dovetailed trackway on said cutting means support block, a tool holder slidably disposed in said dovetailed trackway having a cutting tool fastened thereto, and a lead screw threaded through said tool holder and rotatably fastened to said ratchet wheel for advancing said cutting tool.

12. The device of claim 1 wherein said cutting means includes a cutting tool and is defined by an indexing wheel, a first lead screw supported on said cutting means supporting block and affixed at one end to said indexing wheel, a first dovetail trackway formed on said cutting means supporting block, a slide body having a lower portion disposed in said dovetail trackway having a threaded sleeve engaging said first lead screw whereby rotating said indexing wheel extends and retracts said slide body along the length of said first lead screw, a slide body upper portion having a second dovetail trackway formed thereon, a slide body intermediate portion defining a swivel whereby said upper and lower portions can rotate relative to each other about said swivel, a second lead screw supported by said second dovetail trackway and threadably carrying a tool holder support plate, said second lead screw responsive to said ratchet wheel, a tool holder on said tool holder support plate and a cutting tool fastened on said tool holder.

13. The device of claim 12 wherein said tool holder support can translate laterally relative to the length of said second lead screw by means of at least one trackway on said tool holder support plate and a complemental track within said last named trackway.

14. The device of claim 13 wherein said ratchet wheel drives said second lead screw through a first gear attached to a shaft and driven by said ratchet wheel meshed with a second gear caried on said second lead screw.

15. The device of claim 1 wherein said clamping means comprises: at least two shoes interposed between the pipe and said first ring member, and an adjusting bolt fastened to and extending through said first ring member whereby said shoes can be tightened and the pipe centered.

16. The device of claim 15 wherein said shoes have a slot on a top face thereof for coaction therein with a spacer block carried by said adjusting bolt, said spacer block having on a face adjacent said shoe a biased ball for registry with a detent on said shoe.

17. The device of claim 1 wherein said clamping means comprises: a tubular mandrel partially inserted within a bore of the pipe, said mandrel fastened to said bore at one extremity, a cone shaped terminus at said extremity, a central shaft extending the length of said mandrel, vane members fastened to said shaft, extending radially outwardly therefrom and supported in guide slots on said cone shaped terminus, and a resilent tensioning member girdling said vanes in notches thereon, whereby axial translation of said shaft relative to said mandrel causes said vanes to ride up and down on said cone shaped terminus.

18. The device of claim 17 wherein said lathe is attached to said mandrel through an annular disc threaded on said mandrel and said mandrel can be translated axially by rotation of said disc.

19. The device of claim 1 including support means for handling said pipe lathe.

20. The device of claim 19 wherein said support means comprises a sling which carries said ring sections and is defined by a triangular upper brace having rods extending from corners ofo said brace, two of which rods engage said ring sections.

21. The device of claim 19 wherein said support means comprises a stand including: a nesting surface for receiving said first ring, adjusting means for elevating said nesting surface and a wheeled carriage underlying said nesting surface provided with hinged arms for folding said carriage.

22. The device of claim 6 where said cutting means is supported on said second ring by a beam extending along a chord of said second ring.

23. The device of claim 1 wherein said ring gear and said drive means are isolated in a housing provided with sealing means to exclude contaminents.

24. A universal lathe for performing plural diverse cutting operations on pipe and the like, comprising, in combination:
clamping means for affixing said lathe to the pipe,
a first stationary ring member interposed between said clamping means and said lathe,
a second rotating ring overlying said first ring and supported thereon, cutting means disposed on said second ring,
drive means carried on said first ring having an output means including a housing with an opening near said output means,
a ring gear carried on said second rotating ring meshing with said output means through said opening,
and a sealing area between said second ring and said housing at said opening whereby said second ring can be driveably rotated but said ring gear and said output means remain free from external contaminents, a follower means operatively associated with said cutting means adapted to advance said cutting means including at least one cam surface on said first stationary ring member, said follower means disposed on said second rotaing ring member oriented to travel over said cam surface, and fluidic pulse means extending between said follower means and said cutting means whereby fluidic pulses generated by said follower traveling over said cam surface similarly indexes said cutting means by advancement thereof by indexing means.

25. The device of claim 24 wherein said drive means comprises at least one fluidic drive motor disposed along a radial line of said rings on the outer circumference thereof.

26. The device of claim 25 wherein said output means includes a drive shaft extending downwardly from said motor and terminates in a truncated conical gear.

27. The device of claim 26 wherein said housing includes a top, bottom and back wall surrounding said truncated conical gear and front wall which occludes said drive shaft.

28. The device of claim 27 wherein said sealing means comprises an annular joint seal extending between said front wall and said second ring, disposed within a slot on said front wall.

29. The device of claim 28 wherein said second adjustable ring is supported on said first ring by means of plural rollers depending from said second ring and riding in a trough on said first ring.

30. The device of claim 29 wherein said first and second rings are each formed from two sections defining junctures which are divided along a chord line to allow said lathe to encompass a section of pipe along its length thereof and said ring sections are each attached by means of hinge pins at each section defined by an apertured tongue at one said section, a bifurcated apertured yoke on another section and fastens thereto by said hinge pins extending through the apertures.

31. The device of claim 24 wherein said indexing means comprises at least one said cam surface provided on a side face of said first ring member nearest said second side face of said second ring member, and said second ring member rotatably carries thereon said follower means oriented to travel over said cam surface, said follower means advancing said cutting means.

32. The device of claim 31 wherein said follower means comprises: a follower support block, a biased cam follower shaft having a follower theron carried on said follower support block, a bell crank fixedly mounted on said cam follower shaft, a fluidic master cylinder carried on said follower support block having plunger means addressing said bell crank, whereby rotation of said follower over said cam surface causes said bell crank to depress said plunger means thereby providing a fluid pulse.

33. The device of claim 32 or 1 wherein said fluidic pulses are carried from said follower means to said cutting means through a fluid containing line, and said line terminates on a cutting means support block; a ball plunger attached to said fluid line and extendable by said fluidic pulses, a pawl mount carried on said cutting means support block, and translated by said ball plunger, a ratchet pawl mounted on said pawl mount and moved with said pawl mount oriented to rotate a ratchet wheel, said cutting means connected to and advance by said ratchet wheel.

34. The device of claim 33 wherein said ratchet wheel includes initializing means on an outer face thereof which advances said cutting means to a working position.

35. The device of claim 34 wherein said initializing means comprises a hand crank on said ratchet wheel.

36. The device of claim 34 wherein said cutting means includes a cutting tool and is defined by a dovetailed trackway on said cutting means support block, a tool holder slidably disposed in said dovetailed trackway having a cutting tool fastened thereto, and a lead screw threaded through said tool holder and rotatably fastened to said ratchet wheeel for advancing said cutting tool.

37. The device of claim 34 wherein said cutting means includes a cutting tool and is defined by an indexing wheel, a first lead screw supported on said cutting means supporting block and affixed at one end to said indexing wheel, a first dovetail trackway formed on said cutting means supporting block, a slide body having a lower portion disposed in said dovetail trackway having a threaded sleeve engaging said first lead screw whereby rotating said indexing wheel extends and retracts said slide body along the length of said first lead screw, a slide body upper portion having a second dovetail trackway formed thereon, a slide body intermediate portion defining a swivel whereby said upper and lower portions can rotate relative to each other about said swivel, a second lead screw supported by said second dovetail trackway and threadably carrying a tool holder support plate, said second lead screw responsive to said ratchet wheel, a tool holder on said tool holder support plate and a cutting tool fastened on said tool holder.

38. The device of claim 37 wherein said tool holder support can translate laterally relative to the length of said second lead screw by means of at least one trackway on said tool holder support plate and a complemental track within said last named trackway.

39. The device of claim 38 wherein said ratchet wheel drives said second lead screw through a first gear attached to a shaft and driven by said ratchet wheel meshed with a second gear carried on said second lead screw.

40. The device of claim 34 wherein said clamping means comprises: at least two shoes interposed between the pipe and said first ring member, and an adjusting bolt fastened to and extending through said first ring member whereby said shoes can be tightened and the pipe centered.

41. The device of claim 40 wherein said shoes have a slot on a top face thereof for coaction therein with a spacer block carried by said adjsting bolt, said spacer block having on a face adjacent said shoe a biased ball for registry with a detent on said shoe.

42. The device of claim 34 wherein said clamping means comprises: a tubular mandrel partially inserted within a bore of the pipe, said mandrel fastened to said first ring member at one extremity, a cone shaped terminus at an opposed extremity, a central shaft extending the length of said mandrel, vane members fastened to said shaft, extending radially outwardly therefrom and supported in guide slots on said cone shaped terminus, and a resilient tensioning member girdling said vanes in notches thereon, whereby axial translation of said shaft relative to said mandrel causes said vanes to ride up and down on said cone shaped terminus.

43. The device of claim 42 wherein said first ring member is attached to said mandrel through an annular disc threaded on said mandrel whereby said mandrel can be translated axially by rotation of said disc.

44. The device of claim 34 including support means for handling said pipe lathe.

45. The device of claim 44 wherein said support means comprises a sling which carries said ring sections and is defined by a triangular upper brace having rods extending from corners of said brace, two of which rods engage said ring segments.

46. The device of claim 44 wherein said support means comprises a stand including: a nesting surface for receiving said first ring, adjusting means for elevating said nesting surface and a wheeled carriage underlying said nesting surface provided with hinged arms for folding said carriage.

47. The device of claim 31 wherein said cutting means is supported on said second ring by a beam extending along a chord of said second ring.

48. A universal lathe for performing plural diverse cutting operations on pipe and the like, comprising, in combination:

clamping means for affixing said lathe to the pipe, a first stationary ring member interposed between said clamping means and said lathe, a second rotating ring member overlying a portion of first ring and supported thereon along a bottom face of said second ring, drive means on said first ring including an output means, a ring gear on a first side face of said second ring member in meshing engagement with said output means, and cutting means on a second opposed side face of said second ring member whereby when said secnd ring member rotates, said cutting means engages the pipe, whereby said cutting means includes indexing means and follower means to advance said cutting means on the pipe, wherein said second ring is supported on said first ring by roller means depending from said second ring and riding in a trough on said first ring, said first and second rings are each formed from two sections defining junctures which are divided along a chord line to allow said lathe to encompass a section of pipe along its length thereof and said ring sections are each attached by means of hinges at each section defined by an apertured bifuracted yoke on one said section which sandwiches an apertured tongue at the other said section and fastens thereto by a pin extending through said apertures, wherein said drive means comprises a fluidic drive motor disposed along a radial line of said rings on the outer circumference thereof, said output means includes a drive shaft extending downwardly from said motor and terminates in a truncated conical gear, wherein said follower means comprises at least one said cam surface provided on a side face of said first ring member nearest said second side face of said second ring member, and said second ring member rotatably carries thereon said follower means oriented to travel over said cam surface, said follower means advancing said cutting means through said indexing means, wherein said follower means comprises: a follower support block, a biased cam follower shaft having a follower thereon carried on said follower support block, a bell crank fixedly mounted on said cam follower shaft, a fluidic master cylinder carried on said follower support block having a plunger means addressing said bell crank, whereby rotation of said follower over said cam surface causes said bell crank to depress said plunger means thereby providing a fluid pulse to said indexing means.

49. A universal lathe for performing plural diverse cutting operations on pipe and the like, comprising, in combination:

clamping means for affixing said lathe to the pipe, a first stationary ring member interposed between said clamping means and said lathe, a second rotating ring overlying said first ring and supported thereon having cutting means disposed on said second ring, drive means carried on said first ring having an output means including a housing with an opening near said output means, a ring gear carried on said second rotating ring meshing with said output means through said opening, and a sealing area between said second ring and said housing at said opening whereby said second ring can be drivably rotated but said ring gear and said output means remain free from external contaminents, wherein said drive means comprises at leat one fluidic drive motor disposed along a radial line of said rings on the outer circumference thereof, wherein said output means includes a drive shaft extending downwardly from said motor and terminates in a truncated conical gear, said housing includes a top, bottom and back wall surrounding said truncated conical gear and front wall which occludes said drive shaft, said sealing means comprises an annular joint seal extending between said front wall and said second ring, disposed within a slot on said front wall, wherein said second adjustable ring is supported on said first ring by means of plural rollers depending from said second ring and riding in a trough on said first ring, wherein said first and second rings are each formed from two sections defining junctures which are divided along a chord line to allow said lathe to encompass a section of pipe along its length thereof and said ring sections are each attached by means of hinge pins at each section defined by an apertured tongue at one said section, a bifurcated apertured yoke on another section and fastens thereto by said hinge pins extending through the apertures, and follower means comprising at leat one said cam surface provided on a side face of said first ring member nearest said second side face of said second ring member, and said second ring member rotatably carries thereon said follower means oriented to travel over said cam surface, said follower means advancing said cutting means through indexing means, wherein said follower means comprises: a follower support block, a biased cam follower shaft having a follower thereon carried on said follower support block, a bell crank fixedly mounted on said cam follower shaft, a fluidic master cylinder carried on said follower support block having plunger means addressing said bell crank, whereby rotation of said follower over said cam surface causes said bell crank to depress said plunger means thereby providing a fluid pulse to said indexing means.

* * * * *